United States Patent [19]

Heitzman et al.

[11] 4,073,591
[45] Feb. 14, 1978

[54] COMPOSITE U JOINT GUARD-STEP

[75] Inventors: Gary N. Heitzman, Washington; Norma G. Shook, Morton, both of Ill.

[73] Assignee: Caterpillar Tractor Co., Peoria, Ill.

[21] Appl. No.: 774,006

[22] Filed: Mar. 3, 1977

[51] Int. Cl.² .............................................. F16C 1/06
[52] U.S. Cl. .................................. 403/24; 403/23; 403/11; 280/164 R
[58] Field of Search .............. 403/23, 24, 25, 286, 403/11; 64/3, 32 R; 280/164 R, 163

[56] References Cited

U.S. PATENT DOCUMENTS

| | | | |
|---|---|---|---|
| 1,192,342 | 7/1916 | Pelton | 403/23 |
| 2,443,035 | 6/1948 | Hardy | 64/3 |
| 2,984,090 | 5/1961 | Bennett | 64/3 |

Primary Examiner—Andrew V. Kundrat
Attorney, Agent, or Firm—Frank L. Hart

[57] ABSTRACT

A composite "U" joint guard-step has a first member and a second member. A first assembly is provided for releaseably maintaining the first member in substantial mating alignment to the second member. A second assembly is provided for maintaining the second member at a preselected position relative to a "U" joint.

The first member has first and second flanges and a middle portion and is of an elongated channel and inverted "U" configuration. The middle portion is generally planar and generally horizontal to provide a step for an operator. The first member is of a configuration sufficient for extending over and being spaced from the "U" joint.

The second member has first and second flanges and is of elongated channel configuration. The second member is of a size sufficient for mating with the first member at the first and second flanges, while being spaced from the "U" joint. In combination with the first member, the first and second members encompass the "U" joint.

10 Claims, 4 Drawing Figures

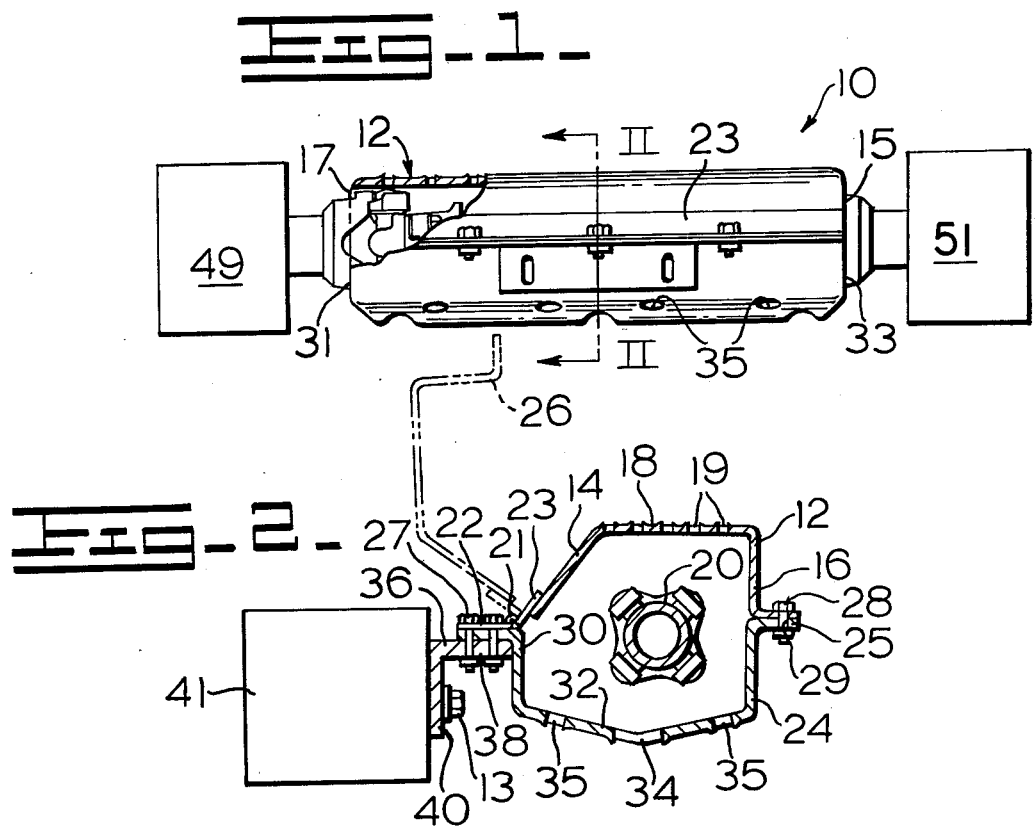
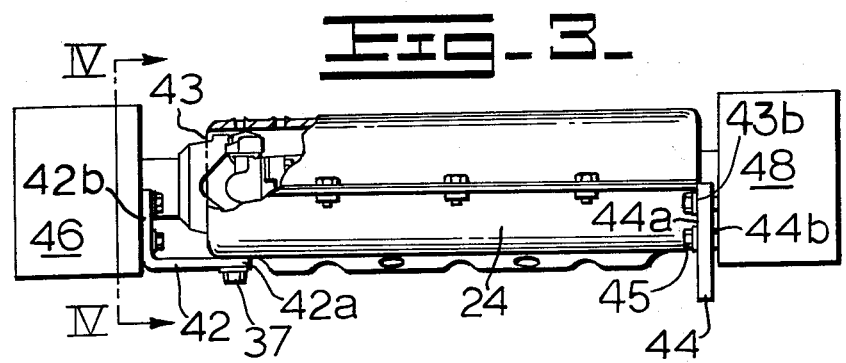
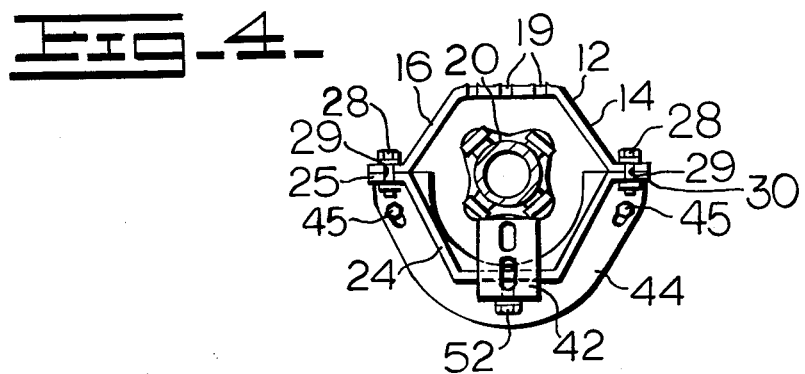

COMPOSITE U JOINT GUARD-STEP

BACKGROUND OF THE INVENTION

This invention pertains generally to a combination of convenience and safety device for operators of heavy machinery, but more particularly to enclosures in the form of guard-steps, for machine components.

Conventional "U" joint guards were generally designed to require time-consuming disassembly in order to gain access to the "U" joint for servicing or repair. Reassembly then required a lining-up of holes and a refastening and locking of the assembly into its original position. When a routine visual check was needed, in the case of a completely enclosed rotating component, such utilized guards represented a waste of servicemen's time.

Further, the conventionally designed guard gave little attention to its function as a safe stepping place for machine operators and mechanics. Such guard construction normally provided for protection against light internal loads such as flying grease or protection against contact by an operator, but generally was not constructed of sufficient strength for constraining a broken "U" joint shaft and/or supporting a man's weight.

In large machines, personnel are required to step upon various machine components to gain access to service areas and observation positions. Modern machines are being built to a considerably greater height, without comparable increase in safe stepping places for operating personnel.

The present invention is directed to overcoming one or more of the problems set forth above.

According to the present invention, a composite "U" joint guard-step comprises a first member and a second member. A first means is provided for releaseably maintaining the first member in substantial mating alignment to the second member. A second means is provided for maintaining the second member at a preselected position relative to a "U" joint.

The first member has first and second flanges and a middle portion and is of an elongated channel and inverted "U" configuration. The middle portion is generally planar and generally horizontal in the installed position over a "U" joint. The first member provides a step for an operator. The first member is of a configuration sufficient for extending over and being spaced from the "U" joint.

The second member has first and second flanges extending outwardly from the second member and is of elongated channel configuration. The second member is of a size sufficient for mating with the first member at its first and second flanges, while being spaced from the "U" joint. In combination with the first member, the first and second member encompass the "U" joint.

BRIEF DESCRIPTION OF THE DRAWINGS

FIG. 1 is a diagrammatic side view of a "U" joint guard-step with a portion broken away to show details of the step portion;

FIG. 2 is a diagrammatic view, in cross-section, taken along line II—II of FIG. 1;

FIG. 3 is a diagrammatic side view of another embodiment of the guard-step; and

FIG. 4 is a diagrammatic end view of the apparatus of FIG. 3.

DETAILED DESCRIPTION OF THE INVENTION

Referring to FIGS. 1 and 2, a guard-step 10, comprises a first member 12, having a first flange 14, a second flange 16, and a middle portion 18. The first member 12 is of an elongated channel, inverted "U" configuration. The middle portion 18 is generally planar and horizontally oriented when in a first position (shown) and has a multiplicity of openings 19 extending therethrough for providing a non-skid stepping area for an operator. The first member 12 is positioned over and spaced from a "U" joint 20.

The preferred construction of FIGS. 1 and 2 has a hinge 21 with a first side 22 and a second side 23. The hinge first side 22 is fixedly connected to the first flange 30 of a second member 24 and the hinge second side 23 is fixedly connected to a first flange 14 of the first member 12. The hinge is oriented for movement of the first member 12 relative to the second member 24 between the first position (shown) and a second position 26 (shown by broken lines) at which the first member 12 is upwardly and laterally spaced from the first position a distance sufficient for the second member 24 and the "U" joint 20 to be accessible from above. When the first member 12 is in the first position it is overlaying the "U" joint 20 and the second member 24.

The first flanges 16 and 25 of the first member 12 and second member 24, respectively, have one or more openings 29 spaced therealong for receiving one or more fasteners 28, thereby releasably connecting the first and second members 12 and 24 in the first position.

The middle portion 18 of the first member 12 is generally horizontally disposed from a first end 15 to a second end 17 and from the flange 14 to the flange 16.

Referring to FIG. 4, an alternate construction for maintaining a first flange 14 of the first member 12 and first flange 30 of the second member 24 provides one or more spaced mating openings 29. One or more fasteners 28 extend through the mating openings 29 and thus provide a releaseable connection of the first flange 14 and first flange 30.

Referring to FIGS. 1 and 2, the guard-step comprises the second member 24, which has first and second flanges 30 and 25, respectively, extending outwardly. The second member 24 is of an elongated channel configuration and mates at its flanges 30 and 25 to the first member flanges 14 and 16, respectively, thereby encompassing the "U" joint 20.

A trough 32 can extend along the bottom of the second member 24 from an end 31 to an end 33. The trough 32 has one or more drain openings 34 in the deepest portion, located in preselected positions so as not to drain mud on underlying machinery components. A plurality of inspection openings 35 are positioned in the trough 32. The second member 24 is preferably constructed of material of a greater thickness than the first member 12.

The guard-step 10 has one or more supports 36 having a first portion 38 and a second portion 40. The first portion 38 is adjustably connected to the flange 30 by one or more fasteners 27 and the second portion 40 is adjustably connected to a machinery structure 41 by one or more fasteners 13. The guard-step 10 may be adjusted at the fasteners 27 and 13 so as to provide reasonable inside clearance of the second member 24 to the "U" joint 20. The machinery structure 41 may be any frame or structural member of a machine.

FIGS. 3 and 4 shows an alternate mounting arrangement for a second member 24 comprising a first support 42 and a second support 44. The first support 42 has a first end portion 42a and a second end portion 42b. The first end portion 42a is adjustably connected to a first end 43 of the second member 24 by a fastener 37. The second portion 42b is adjustably connected to a machinery component 46. The second support 44 is generally flat and of "U" configuration and has a first side 44a and a second side 44b. The first side 44a is fixedly secured to a second end portion 43b of the second member 24 and is adjustably connected at a second side 44b to a machinery component 48 by a plurality of fasteners 45. The adjustable connections 42a, 42b and 44b are of a construction sufficient to insure a desirable inside clearance of the second member 24 to the "U" joint 20.

An alternate construction for releasably connecting the first member 12 to the second member 24 is provided. In this alternate embodiment, the first and second flanges 30 and 25, respectively, of the second member 24 have a plurality of spaced mating openings 29. A plurality of fasteners 28 are secured through the plurality of mating openings 29 to maintain the first member 12 and the second member 24. Removal of fasteners 28 releases first member 12 from second member 24 thereby exposing the "U" joint 20 and the second member 24.

Referring to FIGS. 1 and 2, the operator, when examining the condition of a "U" joint 20 from above, may look through a plurality of openings 19. If the operator examines the "U" joint from below, he may look through a plurality of openings 34 and 35. If the operator wishes to repair or replace the "U" joint 20, he may remove fasteners 28, and lift the first member 12 upward and outwardly to the second position 26 and proceed with the "U" joint work. If, while working on the "U" joint 20, the operator inadvertently drops "U" joint parts or repair tools, the second member 24 catches them in the trough 32 and the operator may easily retrieve them. When the mechanic removes or makes major repairs to machinery components 49 or 51 or machinery structure 41, he may remove fasteners 13 (first member 12 in the second position 26) and remove the entire guard step 10 from the machine.

If an operator or mechanic desires to gain access to machine structures positioned above the guard-step 10, he may safely stand on the middle portion 18 of the first member 12.

The embodiments of the invention in which an exclusive property or privilege is claimed are defined as follows:

1. A composite "U" joint guard-step, comprising:
   a first member having first and second flanges and a middle portion and being of an elongated channel and inverted "U" configuration, said middle portion being generally planar and generally horizontal in the installed position over a "U" joint and having a non-skid means thereon and being of a strength sufficient for providing a step for an operator, said first member being of a configuration sufficient for extending over and being spaced from a "U" joint;
   a second member having first and second flanges extending outwardly from said second member, and being of an elongated channel configuration and of a size sufficient for mating with said first member while being spaced from the "U" joint and, in combination with said first member, encompassing said "U" joint;
   first means for releasably maintaining the first member in substantial mating alignment relative to the second member flanges; and
   second means for maintaining the second member at a preselected position relative to said "U" joint.

2. A guard-step, as set forth in claim 1, including:
   a multiplicity of openings extending through said middle portion of said first member.

3. A guard-step as set forth in claim 1, wherein said first means comprises:
   at least one hinge having first and second sides, said first side being fixedly connected to said first flange of the second member and said second side being fixedly connected to said first flange of the first member, said hinge being oriented for movement of the first member relative to said second member between a first position, at which the first member is overlaying a "U" joint and the second member (with said first member middle portion being generally horizontally disposed), and a second position at which said first member is upwardly and laterally spaced from said first position a distance sufficient for said second member and said "U" joint being accessible from above; and wherein said second flanges of said first and second members each have at least one mating opening and including at least one fastener extending through said mating opening.

4. A guard-step, as set forth in claim 1, wherein said first flanges of said first and second members each have at least one mating opening and including:
   at least one fastener extending through said mating opening.

5. A guard-step as set forth in claim 1, wherein said second means comprises at least one support having first and second end portions and being connected at the first end portion to one of said flanges of said second member and at the second end portion to adjacent structure.

6. A guard-step, as set forth in claim 1, wherein said second means comprises at least first and second supports, each having first and second end portions, said first support being adjustably connected at its first end portion to one end portion of said second member and at the second end portion to adjacent structure, and said second support being connected at the first end portion to the other end portion of said second member and the second end portion to adjacent structure.

7. A guard-step, as set forth in claim 1, wherein a trough is formed along a lower portion of said second member.

8. A guard-step, as set forth in claim 6, wherein the trough contains one or more openings.

9. A guard-step, as set forth in claim 1, wherein the thickness of said second member is greater than the thickness of said first member.

10. A guard-step, as set forth in claim 1, wherein said guard-step is connected to a crawler tractor.

* * * * *